US012654259B2

(12) United States Patent (10) Patent No.: US 12,654,259 B2

Murazawa (45) Date of Patent: Jun. 16, 2026

(54) DIAMOND SUBSTRATE MANUFACTURING METHOD

(71) Applicant: DISCO CORPORATION, Tokyo (JP)

(72) Inventor: Naoki Murazawa, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 466 days.

(21) Appl. No.: 18/341,125

(22) Filed: Jun. 26, 2023

(65) Prior Publication Data

US 2024/0001490 A1 Jan. 4, 2024

(30) Foreign Application Priority Data

Jul. 1, 2022 (JP) ................................. 2022-107287

(51) Int. Cl.
B23K 26/53 (2014.01)
B28D 5/00 (2006.01)
(Continued)

(52) U.S. Cl.
CPC ............ B23K 26/53 (2015.10); B28D 5/0011 (2013.01); C01B 32/28 (2017.08); B23K 2103/52 (2018.08)

(58) Field of Classification Search
CPC ...... B23K 26/53; B23K 26/352; B23K 26/08; B23K 26/60; B23K 26/0622; B23K 26/0006; B23K 26/402; B23K 26/38; B23K 26/364; B23K 26/50; B23K 2103/52; B28D 5/0011; B28D 5/04; B28D 5/047;
(Continued)

(56) References Cited

U.S. PATENT DOCUMENTS

2020/0105543 A1* 4/2020 Nomoto ............ H01L 21/02433
2020/0171607 A1 6/2020 Duek
(Continued)

FOREIGN PATENT DOCUMENTS

JP 01273687 A 11/1989
JP 2020050563 A 4/2020
(Continued)

OTHER PUBLICATIONS

English translation of JP2002192370 (Year: 2002).*
(Continued)

*Primary Examiner* — Galen H Hauth
*Assistant Examiner* — Baileigh Kate Darnell
(74) *Attorney, Agent, or Firm* — Greer Burns & Crain Ltd.

(57) ABSTRACT

A diamond substrate manufacturing method includes positioning a focal point of a processing laser beam of such a wavelength as to be transmitted through diamond to a depth from a first surface of a workpiece including diamond, the depth corresponding to a thickness of a diamond substrate to be manufactured, applying the processing laser beam to form a peeling layer including graphite sections formed through graphitization of portions inside the workpiece and cracks extending from the graphite sections, applying a peeling laser beam of such a wavelength as to be transmitted through diamond and absorbed in graphite, to heat the graphite sections, thereby causing at least a part of the graphite sections to react with oxygen in the atmosphere to generate carbon dioxide and to form gaps, and peeling off the diamond substrate from the workpiece with the gaps as a starting point.

5 Claims, 4 Drawing Sheets

(51) Int. Cl.

| | |
|---|---|
| *C01B 32/28* | (2017.01) |
| *C30B 29/04* | (2006.01) |
| *H10P 34/42* | (2026.01) |
| *B23K 103/00* | (2006.01) |

(58) Field of Classification Search
CPC . H01L 21/268; H01L 21/304; H01L 21/0405;
C01B 32/28; C30B 29/04; C30B 33/02;
C30B 33/04
See application file for complete search history.

(56) References Cited

U.S. PATENT DOCUMENTS

| | | | |
|---|---|---|---|
| 2021/0146475 A1 | 5/2021 | Patil et al. | |
| 2023/0417795 A1* | 12/2023 | Tetard .................... | G01Q 70/14 |

FOREIGN PATENT DOCUMENTS

| | | |
|---|---|---|
| JP | 2020531407 A | 11/2020 |
| RU | 2556177 C1 | 7/2015 |
| WO | 2016021710 A1 | 2/2016 |

OTHER PUBLICATIONS

Office Action issued in counterpart German patent application No.
10 2023 205 923.1, dated Feb. 26, 2026.
Office Action issued in counterpart Japanese patent application No.
2022-107287, dated Apr. 28, 2026.

* cited by examiner

DIAMOND SUBSTRATE MANUFACTURING METHOD

BACKGROUND OF THE INVENTION

Field of the Invention

The present invention relates to a diamond substrate manufacturing method.

Description of the Related Art

Diamond, due to its excellent physical characteristics such as dielectric strength and thermal conductivity, has been paid attention to as a semiconductor material in recent years. In view of this, to efficiently manufacture a diamond substrate from a diamond ingot, there has been developed a method of positioning a focal point of a laser beam to the inside of a diamond ingot and applying the laser beam while relatively moving the ingot and the focal point, to thereby form a peeling layer inside the ingot (see Japanese Patent Laid-open No. 2020-050563).

SUMMARY OF THE INVENTION

While ultrasonic vibrations are applied at the time of peeling off a diamond substrate from the ingot in the method of Japanese Patent Laid-open No. 2020-050563, development of a more efficient peeling method is keenly demanded.

Accordingly, it is an object of the present invention to provide a diamond substrate manufacturing method by which a diamond substrate can be manufactured efficiently.

In accordance with an aspect of the present invention, there is provided a diamond substrate manufacturing method for manufacturing a diamond substrate from a workpiece including diamond and having a first surface and a second surface on a side opposite to the first surface, the diamond substrate manufacturing method including a focal point positioning step of positioning a focal point of a processing laser beam of such a wavelength as to be transmitted through diamond to a depth from the first surface, the depth corresponding to a thickness of the diamond substrate to be manufactured, a peeling layer forming step of applying the processing laser beam to the workpiece while relatively moving the focal point and the workpiece, to form a peeling layer including graphite sections formed through graphitization of portions inside the workpiece and cracks extending from the graphite sections, and a peeling step of applying a peeling laser beam of such a wavelength as to be transmitted through the diamond and absorbed in graphite to the workpiece, to heat the graphite sections to such a temperature that the graphite sections react with oxygen in an atmosphere, thereby causing at least a part of the graphite sections to react with oxygen in the atmosphere to generate carbon dioxide and to form gaps, and peeling off the diamond substrate from the workpiece with the gaps as a starting point, after the peeling layer forming step is carried out.

Preferably, in the peeling step, the gaps are formed from a peripheral part toward a central part of the workpiece.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described in detail below with reference to the attached drawings. The present invention is not to be limited by the contents of the description of the following embodiment. In addition, the following constituent elements include those which can easily be conceived by those skilled in the art, and substantially the same elements. Further, the following configurations can be combined with one another as required. Besides, various kinds of omission, replacement, or modification of the configurations can be performed insofar as they do not depart from the gist of the invention.

A diamond substrate manufacturing method according to an embodiment of the present invention will be described below based on the drawings. The diamond substrate manufacturing method of the embodiment is a method for manufacturing a diamond substrate 20 depicted in FIG. 8 and the like from a workpiece 10 depicted in FIG. 1.

Figure 1:
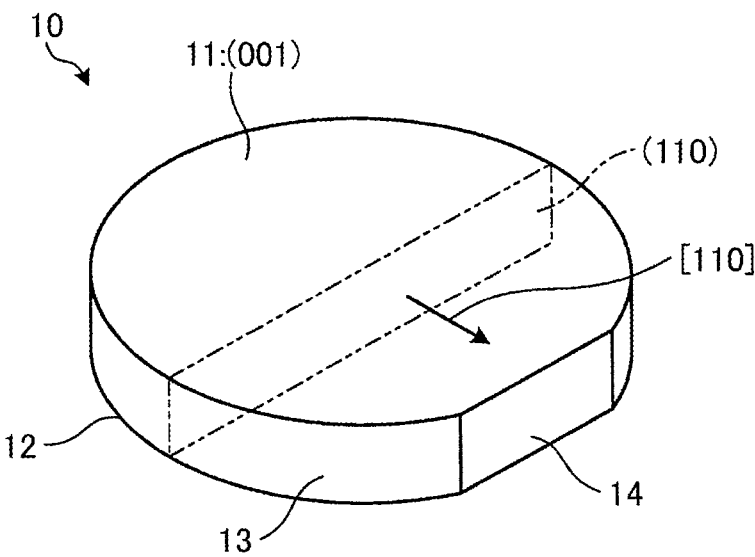
FIG. 1 is a perspective view of a workpiece which is an object of processing by a diamond substrate manufacturing method according to an embodiment of the present invention.

First, a configuration of the workpiece 10 as an object of processing in the diamond substrate manufacturing method according to the embodiment of the present invention will be described. FIG. 1 is a perspective view of the workpiece 10 as the object of processing in the diamond substrate manufacturing method according to the embodiment. The workpiece 10 in the embodiment depicted in FIG. 1 is an ingot which is formed of diamond and is formed as a whole in a cylindrical shape. The workpiece 10 has a first surface 11, a second surface 12, a circumferential surface 13, and an orientation flat 14.

The first surface 11 is circular in shape and is an end face on one side of the workpiece 10 formed in the cylindrical shape, the end face being formed by flattening a crystal plane (001). The second surface 12 is circular in shape and is an end face on a side opposite to the first surface 11 of the workpiece 10 formed in the cylindrical shape. The second surface 12 corresponds to a bottom surface of the workpiece 10. The circumferential surface 13 is a surface connected with an outer edge of the first surface 11 and an outer edge of the second surface 12. The orientation flat 14 is a plane which lies in parallel to a crystal plane (110) and is formed at a part of the circumferential surface 13 for indicating crystal orientation of the workpiece 10. Note that, in FIG. 1, crystal orientation [110] orthogonal to the crystal plane (110) is indicated by an arrow.

Figure 2:
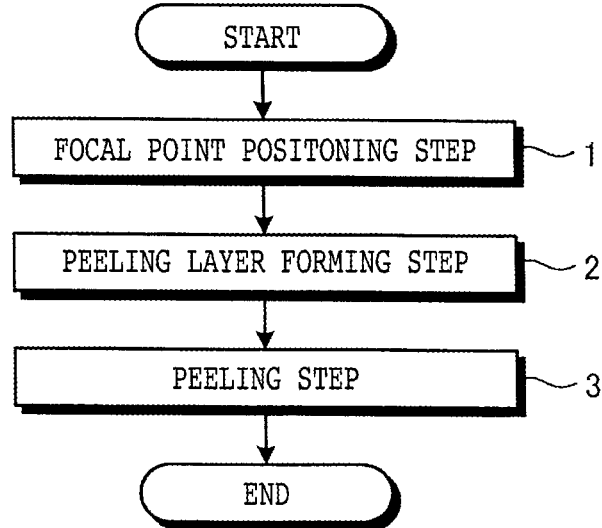
FIG. 2 is a flow chart depicting a flow of the diamond substrate manufacturing method according to the embodiment.

Next, the diamond substrate manufacturing method according to the embodiment of the present invention will be described. FIG. 2 is a flow chart depicting a flow of the diamond substrate manufacturing method according to the embodiment. The diamond substrate manufacturing method includes a focal point positioning step 1, a peeling layer forming step 2, and a peeling step 3.

Figure 3:
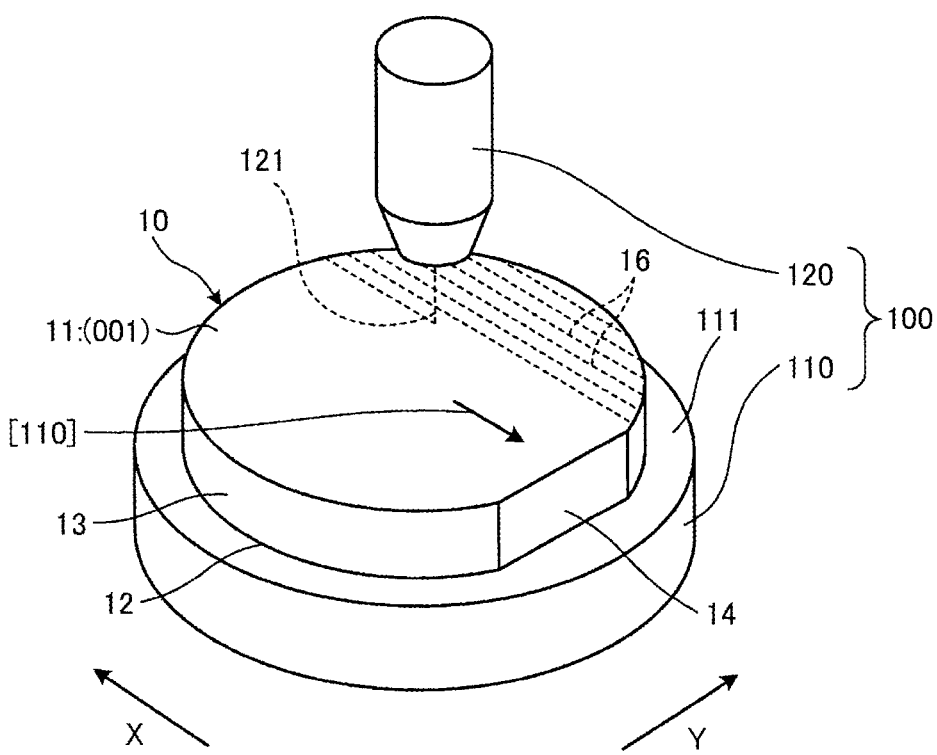
FIG. 3 is a perspective view depicting one example of a focal point positioning step and a peeling layer forming step depicted in FIG. 2.
Figure 4:
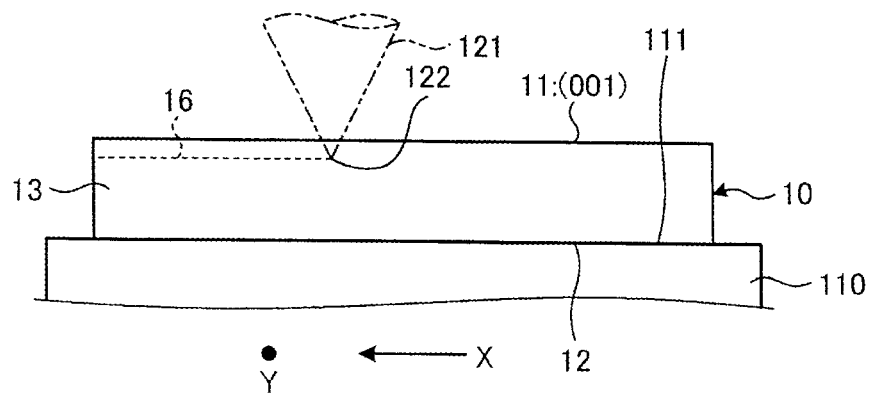
FIG. 4 is a side view depicting, partly in section, a state of FIG. 3.
Figure 5:
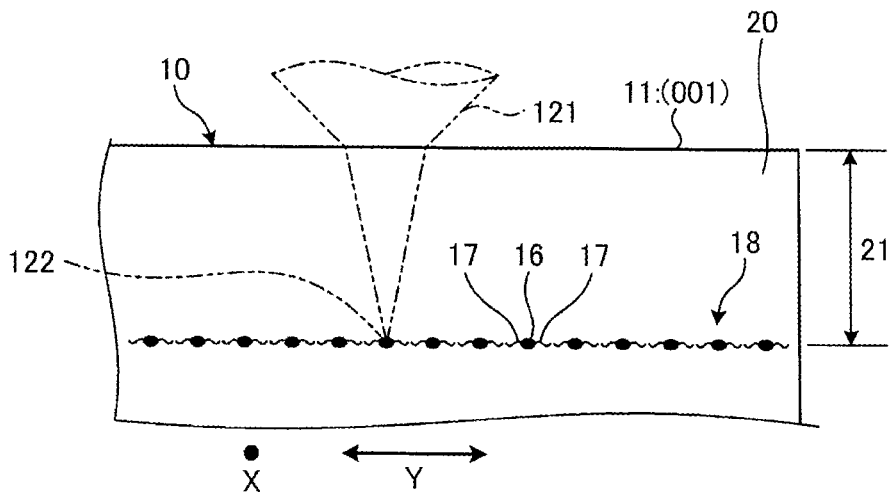
FIG. 5 is an enlarged view of a part of FIG. 4.

FIG. 3 is a perspective view depicting one example of the focal point positioning step 1 and the peeling layer forming step 2 depicted in FIG. 2. FIG. 4 is a side view depicting, partly in section, a state of FIG. 3. FIG. 5 is an enlarged view of a part of FIG. 4.

The focal point positioning step 1 and the peeling layer forming step 2 of the embodiment are carried out by use of a laser processing apparatus 100 depicted in FIG. 3. The laser processing apparatus 100 includes a holding table 110, a laser beam applying unit 120, an unillustrated moving unit that relatively moves the holding table 110 and the laser beam applying unit 120, and an unillustrated imaging unit.

The holding table 110 holds the workpiece 10 by a holding surface 111. The holding surface 111 is formed in a disk-like shape from a porous ceramic material or the like. The holding surface 111 in the embodiment is a plane lying in parallel to a horizontal direction. The holding surface 111 is connected to a vacuum suction source through a vacuum suction passage, for example. The holding table 110 holds under suction the second surface 12 side of the workpiece 10 placed on the holding surface 111.

The laser beam applying unit 120 applies a processing laser beam 121 of such a wavelength as to be transmitted through diamond, to the workpiece 10 held on the holding surface 111 of the holding table 110. The laser beam applying unit 120 can be moved relative to the holding table 110 by the unillustrated moving unit.

Note that, in the following description, an X-axis direction is one direction in a horizontal plane. A Y-axis direction is a direction orthogonal to the X-axis direction in the horizontal plane. In addition, in the embodiment, the X-axis direction is a processing feed direction and is a direction parallel to the crystal orientation [110]. Besides, in the embodiment, the Y-axis direction is an indexing feed direction and corresponds to crystal orientation [–110].

The focal point positioning step 1 is a step for positioning a focal point 122 of the processing laser beam 121 at a depth, which corresponds to a thickness 21 of the diamond substrate 20 to be manufactured, from the first surface 11. In the focal point positioning step 1, first, the second surface 12 side of the workpiece 10 is held under suction on the holding surface 111 of the holding table 110 of the laser processing apparatus 100.

In the focal point positioning step 1, next, alignment is carried out in which the workpiece 10 held on the holding table 110 is imaged by the unillustrated imaging unit and positioning between the laser beam applying unit 120 and the workpiece 10 is carried out by the unillustrated moving unit. In this instance, the orientation flat 14 of the workpiece 10 is adjusted to be parallel to the indexing feed direction (Y-axis direction), and the processing feed direction (X-axis direction) is matched to the direction parallel to the crystal orientation [110]. In addition, the laser beam applying unit 120 is positioned above one end part, in the X-axis direction which is the processing feed direction, of an outer edge part of the workpiece 10.

In the focal point positioning step 1, next, a light concentrator of the laser beam applying unit 120 is moved by the unillustrated moving unit, to position the focal point 122 of the processing laser beam 121 inside the workpiece 10. In this instance, the depth of the focal point 122 from the first surface 11 corresponds to the thickness 21 (see FIG. 5) of the diamond substrate 20 to be manufactured.

In the peeling layer forming step 2, the focal point 122 of the processing laser beam 121 is subjected to processing feed, in a state in which the focal point 122 is positioned at the depth corresponding to the thickness 21 of the diamond substrate 20 to be manufactured. In other words, the light concentrator of the laser beam applying unit 120 and the workpiece 10 held by the holding table 110 are relatively moved by the unillustrated moving unit, so that the processing laser beam 121 is applied toward the inside of the workpiece 10 while the focal point 122 is being relatively moved in the direction of the crystal orientation [110].

In the peeling layer forming step 2, in the inside of the workpiece 10 formed of diamond, the part through which the focal point 122 has passed is graphitized by irradiation with the processing laser beam 121. In other words, at a position of the depth corresponding to the thickness 21 of the diamond substrate 20 to be manufactured, a graphite section 16 is formed along the processing feed direction, and cracks 17 extending from the graphite section 16 in a plane direction substantially parallel to the crystal plane (001) are formed. In other words, the cracks 17 extend in the indexing feed direction (Y-axis direction). In this way, in the peeling layer forming step 2, a peeling band including the graphite section 16 and the cracks 17 extending from the graphite section 16 along the indexing feed direction is formed.

In the peeling layer forming step 2, after the graphite section 16 is formed over a range from one end part to the other end part in the processing feed direction (X-axis direction) of the outer edge part, the application of the processing laser beam 121 from the laser beam applying unit 120 is temporarily stopped, and indexing feed is conducted. More specifically, the holding table 110 is moved in the indexing feed direction (Y-axis direction) and in the processing feed direction (X-axis direction) such that the laser beam applying unit 120 is positioned above one end part, in the X-axis direction which is the processing feed direction, of the outer edge part of the workpiece 10, the one end part being adjacent to the position where the graphite section 16 has already been formed in the workpiece 10.

Then, again, the processing laser beam 121 is applied toward the inside of the workpiece 10 while the focal point 122 is being relatively moved in the processing feed direction (the direction of the crystal orientation [110]). In this way, the application of the processing laser beam 121 along the processing feed direction and the indexing feed are repeated, so that the peeling bands are formed over the whole plane inside the workpiece 10, the peeling bands constituting a peeling layer 18. The peeling layer forming step 2 is then finished, and the control proceeds to the peeling step 3.

Figure 6:
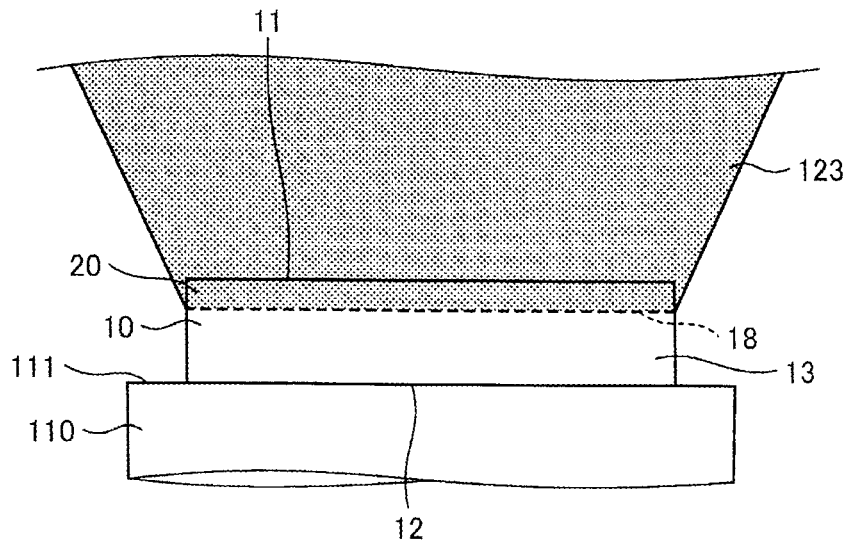
FIG. 6 is a side view depicting, partly in section, one example of a peeling step depicted in FIG. 2.

FIG. 6 is a side view depicting, partly in section, an example of the peeling step 3 depicted in FIG. 2. The peeling step 3 is carried out after the peeling layer forming step 2 is performed. The peeling step 3 is a step for peeling off the diamond substrate 20 from the workpiece 10.

In the peeling step 3, first, a peeling laser beam 123 is applied to the workpiece 10 to heat the graphite sections 16. The peeling laser beam 123 is a laser beam of such a wavelength as to be transmitted through diamond and absorbed in graphite, specifically, a carbonic acid gas ($CO_2$) laser. Graphite has a high absorbing power for the wavelength (9.2 to 10.8 μm) of the carbonic acid gas laser.

In the peeling step 3, the peeling laser beam 123 is applied to the entire peeling layer 18 in the workpiece 10, so that the graphite sections 16 are heated to a temperature at which graphite reacts with oxygen in the atmosphere. As a result, carbon (C) of at least a part of the graphite sections 16 reacts with oxygen ($O_2$) in the atmosphere, to generate carbon dioxide ($CO_2$). In this regard, the graphite sections 16 are in contact with the air at a peripheral part of the workpiece 10, and hence, an oxidation reaction proceeds from the peripheral part toward a central part.

In the peeling layer 18 of the workpiece 10, gaps are formed at parts where the graphite sections 16 have been changed to carbon dioxide. In the peeling step 3, at least a part of the graphite sections 16 is caused to react with oxygen in the atmosphere to generate carbon dioxide, so that gaps are formed at the peeling layer 18. In the peeling step 3, the graphite sections 16 may be caused to react with oxygen until gaps are formed over the entire peeling layer 18 and the diamond substrate 20 is peeled off from the workpiece 10 with the peeling layer 18 as an interface, but the peeling may be conducted by another method at a time point when gaps have been formed to a certain extent.

Figure 7:
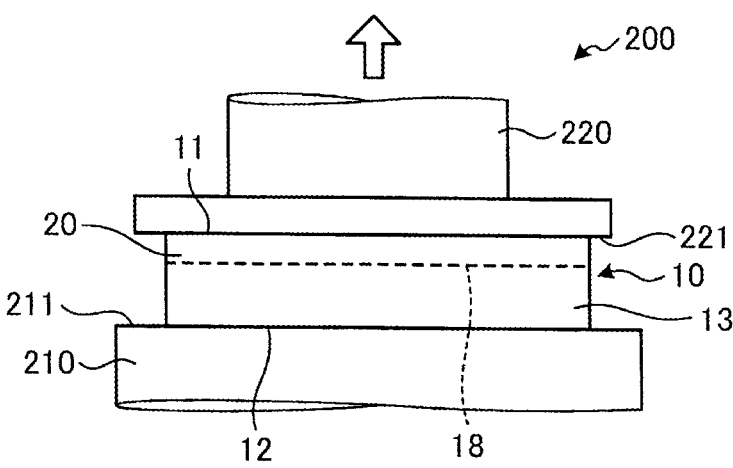
FIG. 7 is a side view depicting, partly in section, a state obtained after FIG. 6 in the peeling step depicted in FIG. 2.
Figure 8:
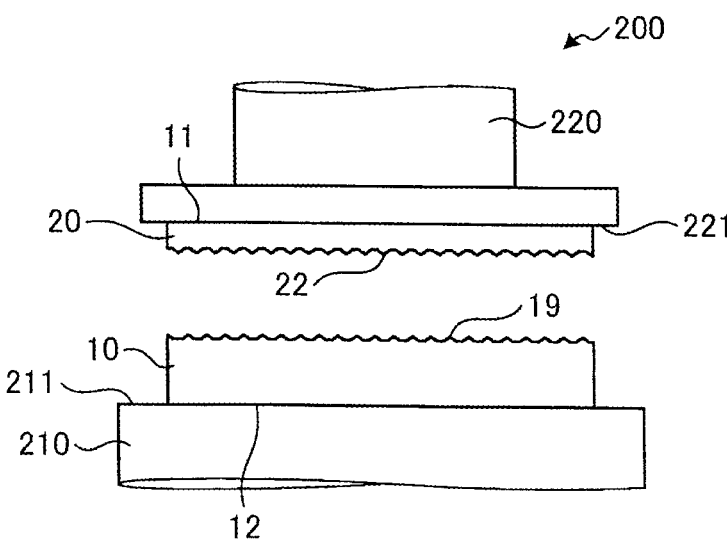
FIG. 8 is a side view depicting, partly in section, a state obtained after FIG. 7 in the peeling step depicted in FIG. 2.

FIG. 7 is a side view depicting, partly in section, a state obtained after FIG. 6 in the peeling step 3 depicted in FIG. 2. FIG. 8 is a side view depicting, partly in section, a state obtained after FIG. 7 in the peeling step 3 depicted in FIG. 2. In the method depicted in FIGS. 7 and 8, after the gaps have been formed to a certain extent in the graphite sections 16, the diamond substrate 20 is peeled off from the workpiece 10 by use of a peeling apparatus 200. The peeling apparatus 200 includes a holding table 210, a peeling unit 220, and an unillustrated moving unit for relatively moving the holding table 210 and the peeling unit 220.

The holding table 210 holds, by a holding surface 211 thereof, the workpiece 10 having been formed with the gaps by being heated at the graphite sections 16. The holding surface 211 is formed in a disk-like shape from a porous ceramic material or the like. The holding surface 211 is a plane lying in parallel to the horizontal direction. The holding surface 211 is connected to a vacuum suction source through a vacuum suction passage, for example. The holding table 210 holds under suction the second surface 12 side of the workpiece 10 placed on the holding surface 211.

The peeling unit 220 is capable of holding under suction the first surface 11 (upper surface) side of the workpiece 10 in a state in which the first surface 11 is in contact with a holding surface 221 of the peeling unit 220. In addition, the peeling unit 220 can be brought close to and away from the holding table 210 that holds the workpiece 10, by the unillustrated moving unit.

As depicted in FIG. 7, in the peeling apparatus 200, first, the second surface 12 of the workpiece 10 is held by the holding surface 211 of the holding table 210. The peeling unit 220 is next brought close to the holding table 210, and the first surface 11 (upper surface) of the workpiece 10 is then held under suction by the holding surface 221. When the peeling unit 220 is brought away from the holding table 210 in this state as depicted in FIG. 8, the workpiece 10 being pulled vertically to opposite directions is separated with the peeling layer 18 formed with the gaps as a starting point, and a part peeled off on the first surface 11 (upper surface) side of the workpiece 10 is manufactured as the diamond substrate 20.

Note that, after the diamond substrate 20 is peeled off from the workpiece 10, for example, a grinding step of grinding a peeling surface 19 of the workpiece 10 and a peeling surface 22 of the diamond substrate 20 is carried out, so that ruggedness in the peeling surfaces 19 and 22 is removed.

As described above, in the diamond substrate manufacturing method of the embodiment, first, the focal point 122 of the processing laser beam 121 is positioned at the depth corresponding to the thickness 21 of the diamond substrate 20 to be manufactured, and the processing laser beam 121 is applied to the whole surface of the workpiece 10, so that the peeling layer 18 including the graphite sections 16 and the cracks 17 is formed at that depth. Next, the peeling laser beam 123 of such a wavelength as to be transmitted through diamond and absorbed in graphite is applied to the workpiece 10, which is a diamond ingot formed with the peeling layer 18 therein, so that the graphite sections 16 are heated.

With the graphite sections 16 heated, an oxidation reaction proceeds from a peripheral part of the workpiece 10 in contact with oxygen in the atmosphere toward a central part of the workpiece 10, so that carbon dioxide is generated, with the result of formation of the gaps in this part, and peeling proceeds from the peripheral part toward the central part. As a result, the diamond substrate 20 can efficiently be manufactured from the workpiece 10 which is the diamond ingot formed with the peeling layer 18 therein.

In addition, in the conventional method in which, after a peeling layer is formed by a laser beam, ultrasonic vibrations are applied to extend cracks, it is necessary to immerse an ingot and an ultrasonic vibrator in a liquid such as pure water at the time of application of ultrasonic vibrations; on the other hand, in the present invention, peeling is caused to proceed by the oxidation reaction, so that the peeling can be performed in a dry process.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A diamond substrate manufacturing method for manufacturing a diamond substrate from a workpiece including diamond and having a first surface and a second surface on a side opposite to the first surface, the diamond substrate manufacturing method comprising:

a focal point positioning step of positioning a focal point of a processing laser beam of such a wavelength as to be transmitted through diamond to a depth from the first surface, the depth corresponding to a thickness of the diamond substrate to be manufactured;

a peeling layer forming step of applying the processing laser beam to the workpiece while relatively moving the focal point and the workpiece, to form a peeling layer including graphite sections formed through graphitization of portions inside the workpiece and cracks extending from the graphite sections; and a peeling step of applying a peeling laser beam of such a wavelength as to be transmitted through the diamond and absorbed in graphite to the entire peeling layer of the workpiece simultaneously, to heat the graphite sections to such a temperature that the graphite sections react with oxygen in an atmosphere, thereby causing at least a part of the graphite sections to react with oxygen in the atmosphere to generate carbon dioxide and to form gaps, and peeling off the diamond substrate from the workpiece with the gaps as a starting point, after the peeling layer forming step is carried out.

2. The diamond substrate manufacturing method according to claim 1, wherein, in the peeling step, the gaps are formed from an entire outer peripheral part toward a central part of the workpiece.

3. The diamond substrate manufacturing method according to claim 1, wherein the peeling laser beam is a carbonic acid gas ($CO_2$) laser.

4. A diamond substrate manufacturing method for manufacturing a diamond substrate from a workpiece including diamond and having a first surface and a second surface on a side opposite to the first surface, the diamond substrate manufacturing method comprising:

a focal point positioning step of positioning a focal point of a processing laser beam of such a wavelength as to be transmitted through diamond to a depth from the first surface, the depth corresponding to a thickness of the diamond substrate to be manufactured;

a peeling layer forming step of applying the processing laser beam to the workpiece while relatively moving the focal point and the workpiece, to form a peeling layer including graphite sections formed through graphitization of portions inside the workpiece and cracks extending from the graphite sections; and a peeling step of applying a peeling laser beam of such a wavelength as to be transmitted through the diamond and absorbed in graphite to the entire peeling layer of the workpiece simultaneously, to heat the graphite sections to such a temperature that the graphite sections react with oxygen in an atmosphere, thereby causing at least a part of the graphite sections to react with oxygen in the atmosphere to generate carbon dioxide and to form gaps, and peeling off the diamond substrate from the workpiece with the gaps as a starting point, after the peeling layer forming step is carried out, wherein the peeling off the diamond substrate is a dry process without application of ultrasonic vibrations.

5. The diamond substrate manufacturing method according to claim 4, wherein the peeling laser beam is a carbonic acid gas ($CO_2$) laser.

\* \* \* \* \*